Nov. 10, 1959  N. SCHWARTZ ET AL  2,912,276
HINGED HOOD FOR OPEN PICKUP TRUCKS
Filed Aug. 14, 1958
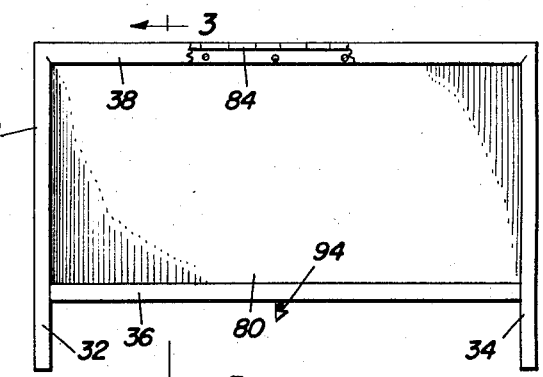
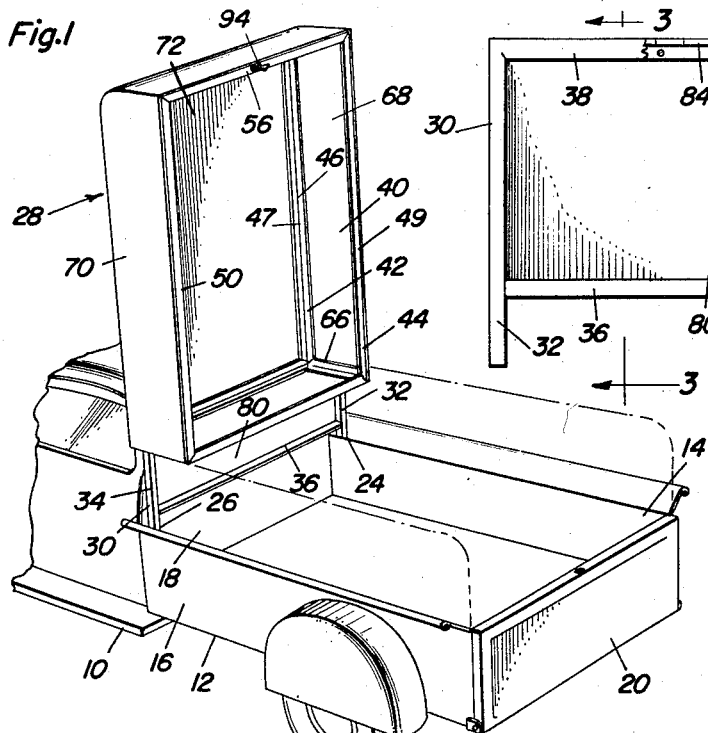
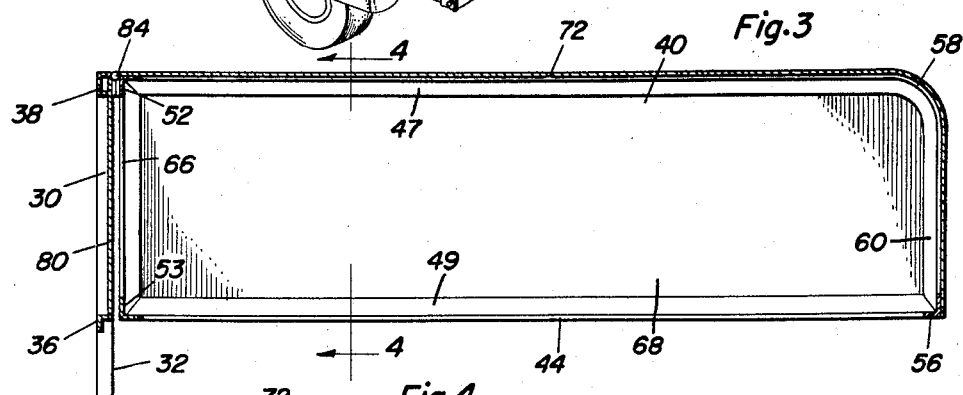
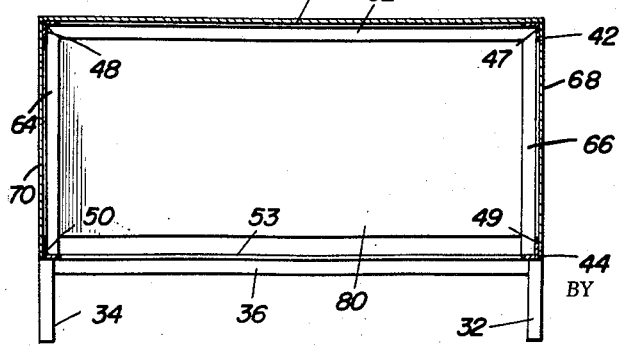
Nathan Schwartz
Charles S. Wax
         INVENTORS
Joseph A. Genovese
BY
         ATTORNEY

United States Patent Office 2,912,276
Patented Nov. 10, 1959

2,912,276

HINGED HOOD FOR OPEN PICKUP TRUCKS

Nathan Schwartz and Charles S. Wax, Miami, Fla.; said Nathan Schwartz assignor, by mesne assignments, to Albert S. Dubbin, Miami, Fla., trustee Application August 14, 1958, Serial No. 755,044

3 Claims. (Cl. 296—100)

This invention relates to truck body enclosures and particularly to a demountable hinged hood for an ordinarily open pickup truck, or any new or old body designs.

We are aware of prior demountable enclosures for truck bodies. Some are for special purposes, for instance, to convert the truck body into a trailer, while others are used to protect the load in the truck body. However, prior truck body enclosures are complex, having doors, a superstructure that is ordinarily retained in fixed position on the truck body, and other structures that make it necessary to separate the enclosure from the truck body in order to remove a large or bulky package or other object from the truck body. For these reasons prior enclosures for truck bodies have not been widely accepted for the class of truck with which our invention is particularly concerned.

An object of this invention is to provide a mechanically simple pickup truck body hood or enclosure which, when elevated to the open position, permits access to the rear and both sides of the truck body for lifting, removing objects or loading the truck. The hood of this invention, when lifted, leaves a completely unobstructed pickup truck body both to the sides and rear and above. There is no structural member or frame arched across the truck body or extending longitudinally down the truck body to form an abutment and thereby create a nuisance.

In considering prior truck body enclosures, it is almost customary to require alteration or defacing the original truck body. A hood constructed in accordance with this invention uses two of the sockets of the truck body that are now standard in all pickup trucks. These sockets accommodate a structural support to which a single hood, having no movable parts, is hinged. The hood can be raised to the open position thereby leaving the truck body completely open as described above, or can be closed as an enclosure over the truck body and the load therein, by merely lowering it. When lowered and the truck is in motion, the wind currents over the hood tend to hold the hood firmly closed.

Another object of the invention is to provide a truck body enclosure that is considerably more practical than prior enclosures but yet, which can be made as a high quality truck attachment at a cost considerably lower than the earlier, more complicated enclosures which rely on doors for access to the truck body.

Other objects and features of importance will become apparent in following the description of the illustrated form of the invention.

Figure 1 is a perspective view of a truck fragment fitted with one of our truck enclosures, the truck being merely one of a large number of manufacturers' makes and styles with which the principles of the invention are applicable, and the truck enclosure shown in the open position in full lines and in the closed position in dotted lines.

Figure 2 is an end view of the enclosure separated from the truck in Figure 1.

Figure 3 is a sectional view taken on the line 3—3 of Figure 2.

Figure 4 is a transverse sectional view taken approximately on the line 4—4 of Figure 3.

In the accompanying drawing there is a truck 10 that schematically represents but one manufacturer's make and model of the numerous pickup trucks that are now commercially available. Each of the trucks, though, has a truck body 12 with sides 14 and 16, an inner wall 18 and a tailgate 20. The sides, or ledge at the top of the sides are now universally equipped with sockets, such as sockets 24 and 26 within which posts and other elongate objects are generally separably disposed.

Our enclosure 28 is made of a structural support 30 having a pair of columns 32 and 34 held spaced apart by transverse braces 36 and 38. Brace 36 can be an angle welded at its ends to columns 32 and 34, or some other structural support may be selected. Similarly, the top brace 38 at the upper end of columns 32 and 34 can be of box beam construction or of some other suitable structural member. The lower ends of columns 32 and 34 are spaced a correct distance to fit into sockets 24 and 26 by simply sliding them vertically downward into the sockets. The downward penetration of the support 30 can be limited by columns 32 and 34 striking the bottoms of the sockets or by brace 36 contacting portions of the sides 14 and 16 of the truck body 12. In either case, when the structural support is installed, it remains erect adjacent to wall 18, which is at the front of the truck body 12.

Enclosure 28 has a hood 40 with a completely open bottom that is adapted to fit over the open top of truck body 12. The hood has frame 42 on which thin panels are attached, as by riveting, welding, using fasteners or the like. Frame 42 is made of a lower rectangular subframe 44 that is the same size as the perimeter of the truck body 12. Upper subframe 46 is approximately rectangular, having a pair of sides 47 and 48 parallel to sides 49 and 50 of subframe 44, a transverse frame member 52 that is parallel to the corresponding transverse frame member 53 of subframe 44, but no transverse end frame member which corresponds to the transverse end frame member 56 of the lower subframe 44. Instead, the ends of sides 47 and 48 are smoothly curved as at 58 (Fig. 3) and have parts which form uprights 60 by being either integral with sides 47 and 48 or fixed thereto, and fixed to the lower subframe 44 at its rear corners. The front part of frame 42 is completed by a pair of front posts 64 and 66 that are attached to the front corners of the upper subframe 46 and the lower subframe 44.

Although the covering for frame 42 can be made in one piece, for instance molded plastic or fabric, it is preferred that the covering for the frame be made of lightweight sheet metallic material, for instance aluminum or sheet steel. There are two side panels 68 and 70 attached to the two sides of frame 40, and a top panel 72 attached to the top of the upper subframe and curved around the curved portions 58 and attached to the posts 62 thereby forming a neat, effective enclosure hood.

The frame 42 can be made of any suitable structural framing members, for instance angle iron. The front of the subframe may be provided with a final panel to form a complete enclosure of the area above the body 12. However, an alternative would be to have panel 80 attached to the support 30 so that it need not be lifted and lowered each time the hood is lifted and lowered. Moreover, the specific construction can be varied in many respects without departing from the invention. For instance, the skin made of the previously described panels, can be on the inside or the outside of the frame 42. The shape of the hood can be varied to suit different manufacturers' makes of trucks. The depth of the hood can be altered so that there is a deep enclosure or a shallow enclosure or, an all purpose intermediate size enclosure.

In use of the enclosure, it is applied to the truck body 12 as described previously. When it is desirable to use the truck body, the entire hood is lifted to the elevated position as shown in Figure 1, this requiring no more than swinging about the hinge axis of the hinge 84 attached to frame member 52 and brace 38 of frame 42 and support 30, respectively. Note that the location of the hinge, that is at the top edge of the hood, causes the hood to swing upwardly close to the cab of the truck, leaving the entire truck body open and completely accessible from both sides and the rear, and this happening simultaneously as opposed to selectively opening one side or the other side or the rear. The space vertically above the truck is open completely so that bulky packages can be lifted or lowered in accordance with the desires of the trucker. The hood can be held open by bracing it upward as shown in Figure 1 or by gently resting against the rear of the cab of the truck, this being possible in some installations. Although shown as a piano hinge, hinge 84 may be omitted in favor of a preferred pair of conventional spring loaded counterbalanced hinges to lift and hold the hood in the 45 degrees open (approximate) position when the later mentioned latch 94 is released. Such hinges are now commonly used on auto and truck engine compartment cover hoods. After the truck is loaded or unloaded, the enclosure can be returned by merely hingedly moving it to the down position as shown in dotted lines in Figure 1. It can be latched down by spring loaded latch 94 on the rear of the frame engaging any suitable part of the truck body, or simply remain in a down position by its own weight. When the truck is moving, the wind load across the top of the hood further aids in keeping it down.

It is understood that various changes may be made in this invention without departing from the scope of the following claims.

We claim:

1. In combination with the body of a pickup truck that has sides provided with upwardly opening sockets, a demountable enclosure comprising a support, said support having a pair of spaced columns with the lower ends thereof separably disposed in said sockets, a transverse brace secured to said columns at the upper ends thereof, a hood having a frame composed of an upper subframe and a lower subframe, means connecting said subframes together in a rigid and unitary frame structure, a hinge connecting said upper subframe at one edge thereof to said transverse brace of said support, and a covering on both of said subframes and extending between said subframes, said lower subframe being of approximately the same dimensions as the perimeter of the top part of the truck body so that when said hood is lowered on said body said lower subframe seats thereon and said hood thereby forms an enclosure of a portion of the space above the truck body.

2. In combination with the body of a pickup truck that has sides provided with upwardly opening sockets, a demountable enclosure comprising a support, said support having a pair of spaced columns with the lower ends thereof separably disposed in said sockets, a transverse brace secured to said columns at the upper ends thereof, a hood having a frame composed of an upper subframe and a lower subframe, means connecting said subframes together in a rigid and unitary frame structure, a hinge connecting said upper subframe at one edge thereof to said transverse brace of said support, a covering on both of said subframes and extending between said subframes, said lower subframe being of approximately the same dimensions as the perimeter of the top part of the truck body so that when said hood is lowered on said body said lower subframe seats thereon and said hood thereby forms an enclosure of a portion of the space above the truck body, and when said hood is hingedly actuated to the open position with respect to said body the rear and sides of the truck body are completely free from all parts of said hood and the space vertically above the body is completely unimpeded at the back of the truck body and substantially completely unimpeded at the sides of the truck body.

3. The enclosure of claim 1 and a latch carried by said lower subframe and engageable with a portion of said truck body to releasably retain said hood in the closed position on said truck body.

References Cited in the file of this patent

UNITED STATES PATENTS

| 1,481,543 | Eke | Jan. 22, 1924 |
| 2,582,635 | Kipple | Jan. 15, 1952 |
| 2,606,674 | Edwards | Aug. 12, 1952 |